(12) United States Patent
Zurek et al.

(10) Patent No.: US 8,543,168 B2
(45) Date of Patent: Sep. 24, 2013

(54) PORTABLE ELECTRONIC DEVICE

(75) Inventors: Robert A. Zurek, Antioch, IL (US); Steve X. Dai, Gilbert, AZ (US); Paul R. Steuer, Hawthorn Woods, IL (US)

(73) Assignee: Motorola Mobility LLC, Libertyville, IL (US)

( * ) Notice: Subject to any disclaimer, the term of this patent is extended or adjusted under 35 U.S.C. 154(b) by 308 days.

(21) Appl. No.: 12/967,208

(22) Filed: Dec. 14, 2010

(65) Prior Publication Data

US 2012/0149437 A1    Jun. 14, 2012

(51) Int. Cl.
  *H04B 1/38*    (2006.01)
(52) U.S. Cl.
  USPC .................. 455/566; 455/550.1; 455/90.3
(58) Field of Classification Search
  USPC ................ 455/566, 550.1, 551, 556.2, 575.1,
      455/90.3, 90.1, 556.1; 345/173
  See application file for complete search history.

(56) References Cited

U.S. PATENT DOCUMENTS

| 5,034,649 | A | 7/1991 | Chida et al. |
| 6,453,045 | B1 | 9/2002 | Zurek et al. |
| 6,674,219 | B1 | 1/2004 | Szilagyi et al. |
| 6,911,901 | B2 | 6/2005 | Bown |
| 7,215,329 | B2 | 5/2007 | Yoshikawa et al. |
| 2002/0118847 | A1 | 8/2002 | Kam |
| 2003/0059069 | A1 | 3/2003 | Bank et al. |
| 2004/0202338 | A1 | 10/2004 | Longbotttom et al. |
| 2006/0050059 | A1 | 3/2006 | Satoch et al. |
| 2006/0052143 | A9 | 3/2006 | Tuovinen |
| 2006/0192771 | A1 | 8/2006 | Rosenberg et al. |
| 2009/0244013 | A1* | 10/2009 | Eldershaw ................... 345/173 |
| 2010/0045612 | A1* | 2/2010 | Molne ........................... 345/173 |
| 2011/0165841 | A1* | 7/2011 | Baek et al. .................. 455/41.2 |

FOREIGN PATENT DOCUMENTS

| WO | 03049493 A1 | 6/2003 |
| WO | 2005067344 A1 | 7/2005 |

OTHER PUBLICATIONS

Patent Cooperation Treaty, International Search Report and Written Opinion of the International Searching Authority for International Application No. PCT/US2011/063437, Mar. 16, 2012, 13 pages.

* cited by examiner

*Primary Examiner* — John J Lee
(74) *Attorney, Agent, or Firm* — Stephen H. Shaw; Sylvia Chen

(57) ABSTRACT

A portable electronic device includes a free floating display lens having a stiffener ring mounted on a peripheral region or edge of the free floating display lens to affect modal density and modal distribution of the free floating display lens. Additionally, a piezoelectric supporting structure is attached to the stiffener ring, while surrounding a display, wherein the piezoelectric supporting structure is electrically driven to produce an acoustic signal in one mode and a vibratory haptic signal in another mode.

18 Claims, 14 Drawing Sheets

PORTABLE ELECTRONIC DEVICE

FIELD OF THE INVENTION

The present invention relates generally to using a display lens of a portable electronic device as an acoustic apparatus, while still allowing a large viewable area for a display. More specifically, the display lens is driven by an electrical signal to produce a substantial usable audio area particularly for private and speakerphone mode conversations. Additionally, the substantial usable audio area can also provide haptic feedback.

BACKGROUND OF THE INVENTION

Conventionally, the dimensions of a display lens for a portable electronic device, such as a mobile phone, are driven by the desired viewable display area and the industrial design of the phone. Therefore, the display lens is not often thought of as an acoustic apparatus or speaker. More often than not it is because those skilled in the art have long recognized that a display lens often has a poor dynamic response due to its physical dimensions.

The configurations of conventional mobile phone display lens have mechanical modes that are very often plentiful and grouped together within the phone's audio band. Any designer of dynamic speakers desires to have as few of these mechanical modes as possible (with the exception of the piston mode) within the phone's audio band. In order to provide the smoothest frequency response of the display lens' driven surface, a designer would greatly like to have these mechanical modes as evenly spaced as possible. Often the front surface of a mobile phone has dimensions that are close to small integer ratios such as 3:2, 4:3, and 16:9, and in a worst case scenario 2:1. For example, one popular phone in the marketplace today has a display lens of about 50 mm×100 mm for a ratio of 2:1. These low-integer ratios result in mechanical modes that bunch up in certain areas of the audio band. FIG. 1 is an illustration of prior art glass lens modal distribution that shows where certain mechanical modes lie within a frequency domain.

In FIG. 1, each vertical line represents a mode at the frequency the line crosses the horizontal axis. There are fourteen modes within a 4 kHz phone audio band and some of these modes tend to group together due to the dimensional ratio of the display lens. At 1 kHz a laser vibrometer measured two modes only within a few Hz of each other after the display lens of a phone was driven mechanically.

Accordingly, there is a need to overcome this exemplary grouping of modes and resulting poor dynamic response of display lens when excited mechanically in order to produce an acoustic signal.

DETAILED DESCRIPTION

The portable electronic device described herein includes a free floating display lens that has a stiffener ring mounted on a peripheral region or edge of the free floating display lens to affect modal density and modal distribution of the free floating display lens. In addition, a piezoelectric supporting structure is attached to the stiffener ring. The piezoelectric supporting structure surrounds a display, and is electrically driven to produce an acoustic signal in one mode and a vibratory haptic signal in another mode.

Figure 1:
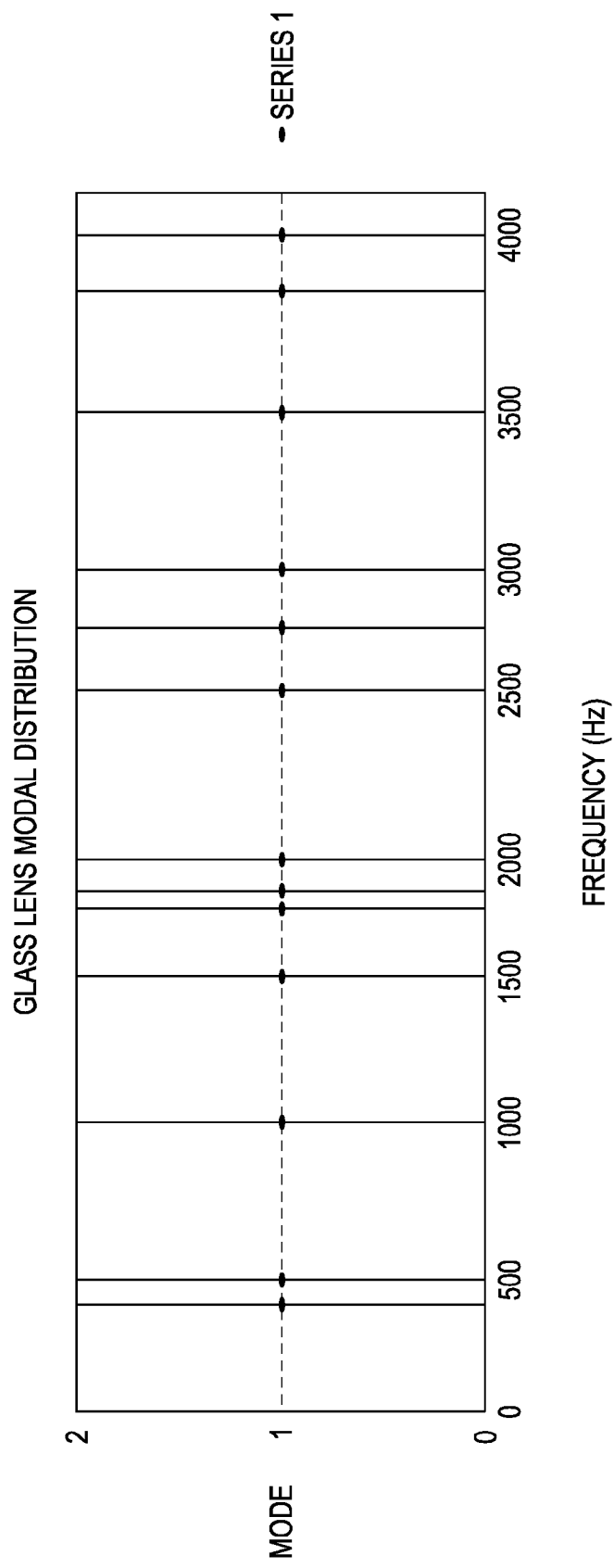
FIG. 1 shows a prior art schematic of a glass lens modal distribution.
Figure 2:
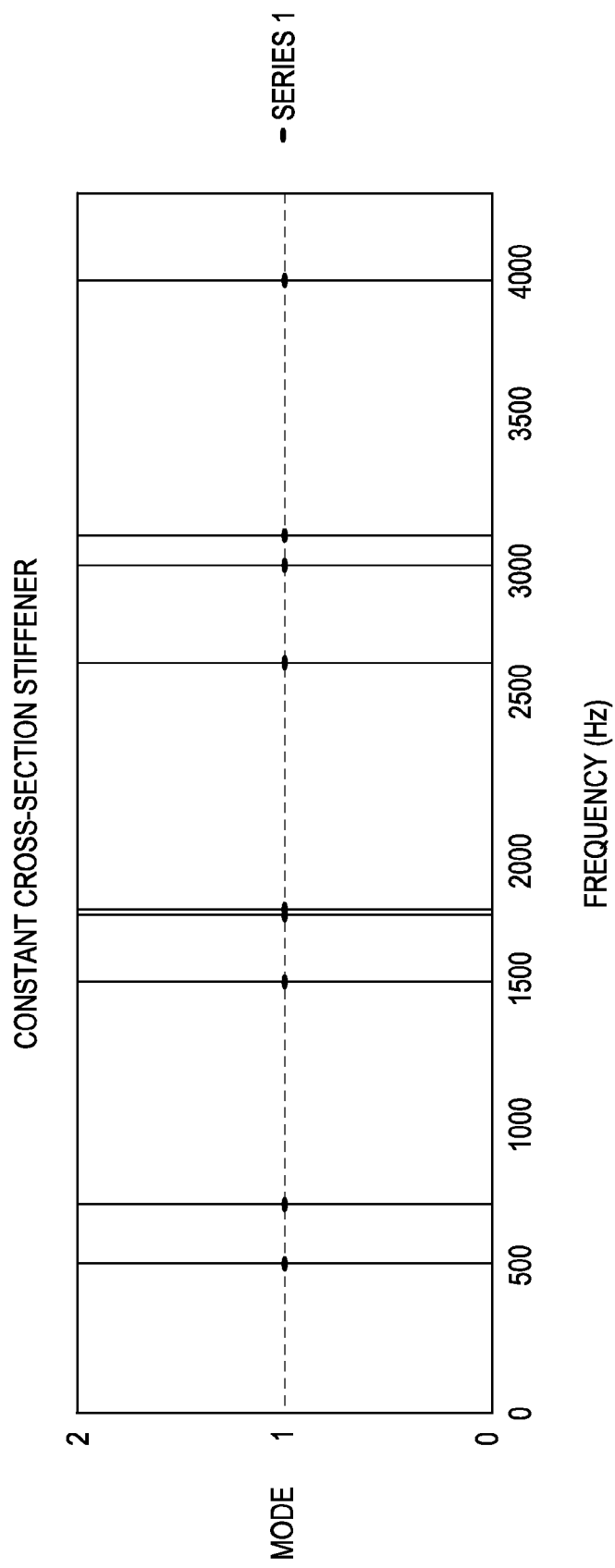
FIG. 2 shows a modal distribution corresponding to a constant cross-section stiffener ring.

Referring to FIG. 2, modal density and modal distribution of a display lens were improved by adding a rigid or stiff ring around an outer edge of a display lens for a portable electronic device, for example, a mobile phone, a netbook computer, or a tablet portable computer. This rigid ring acts to stiffen the entire display lens, resulting in an upward shift of the display lens' modes, and will hereafter be referred to as a stiffener ring. The use of a stiffener ring allows for an optimal balance between stiffening the display lens and occluding too much of the display lens' area which would reduce the opening for the display. Accordingly, FIG. 2 shows the effect of a constant cross-section stiffener ring on the modes of the display lens in a mobile phone's audio band. Notably, there remain only nine modes in the audio band after the upward shift. However, a rigid stiffener ring of a constant cross section alone only shifts the modes of the glass up and does not effect the distribution of those modes. As can be seen in FIG. 2, at least two modes remain close together at about 1700-1800 Hz.

Figure 3:
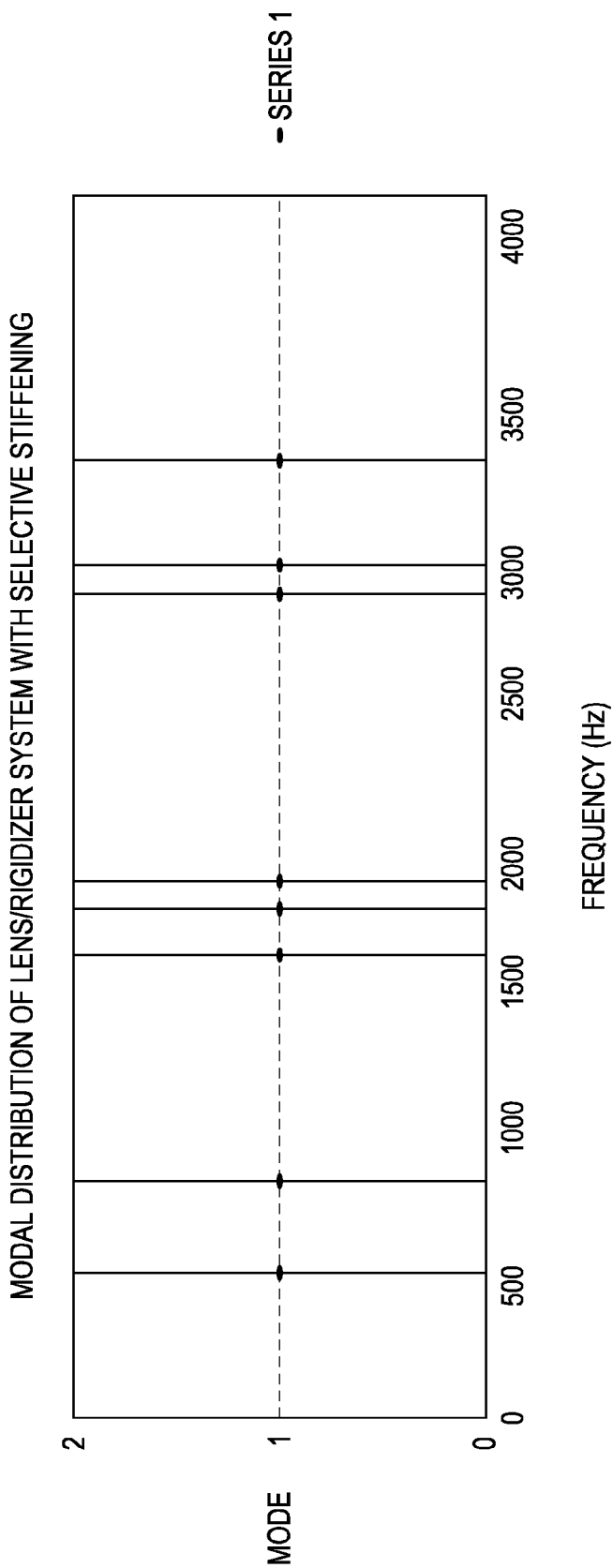
FIG. 3 shows a modal distribution corresponding to a display lens having a selective stiffener ring.

Referring to FIG. 3, an additional approach beyond placing a stiffener ring around the outer edge of the display lens is needed to address the situation where two or more modes are bunched together within a few hertz. One exemplary approach for spreading these clustered modes is to additionally stiffen the outer edge of the lens by selectively thickening portions or sections of the stiffener ring.

The location or points where there is thickening of the stiffener ring correlates to individual modes that one desires to shift. In general, for a given mode, the points of highest stress or change in deformation of the edge of the stiffener ring/display lens combination are affected. Specifically, these points of greatest change in deformation are at the nodes and antinodes of the modes. By selectively thickening the area around high stress points for a few modes, the frequencies of those modes can be shifted without significantly affecting the resonance of other modes. FIG. 3 shows the result of selectively thickening the stiffener ring.

Clearly, FIG. 3 shows that with the process of selectively thickening the stiffener ring, the resonances are shifted around to more evenly distribute the modes themselves and even shift one additional mode out of the audio band; thus, leaving only eight modes across the phone's entire audio band. As a result, FIG. 3 shows a stark improvement over the original lens through the 43% reduction of in-band modes and a more even distribution of modes altogether.

Figure 4:
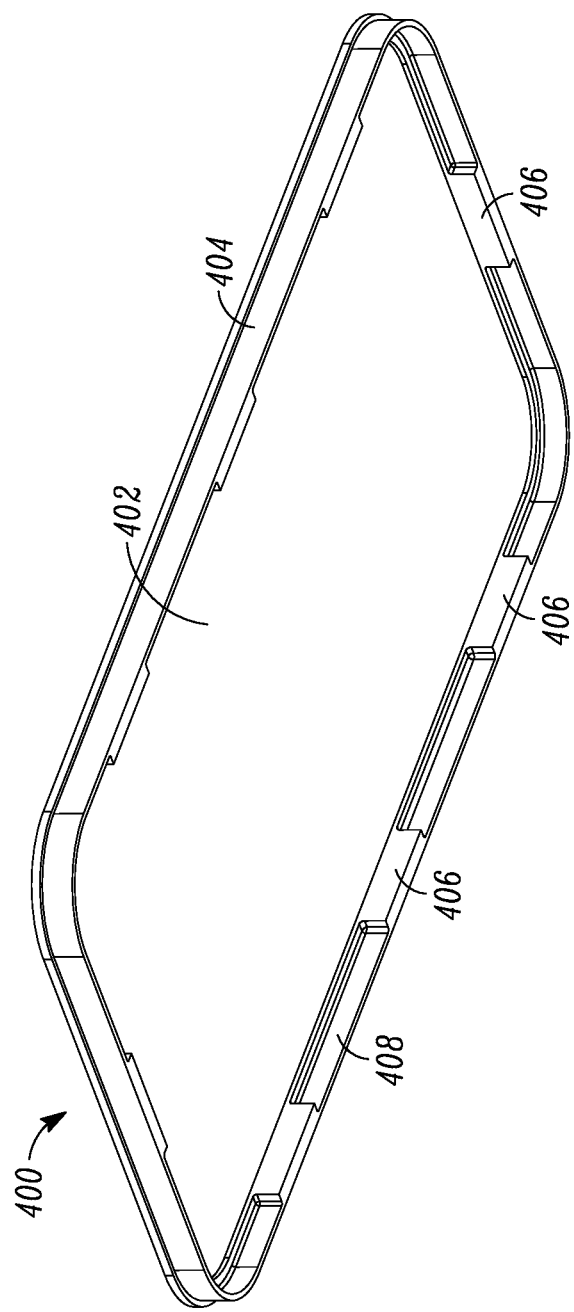
FIG. 4 shows an exemplary rigid ring around a display lens.
Figure 5:
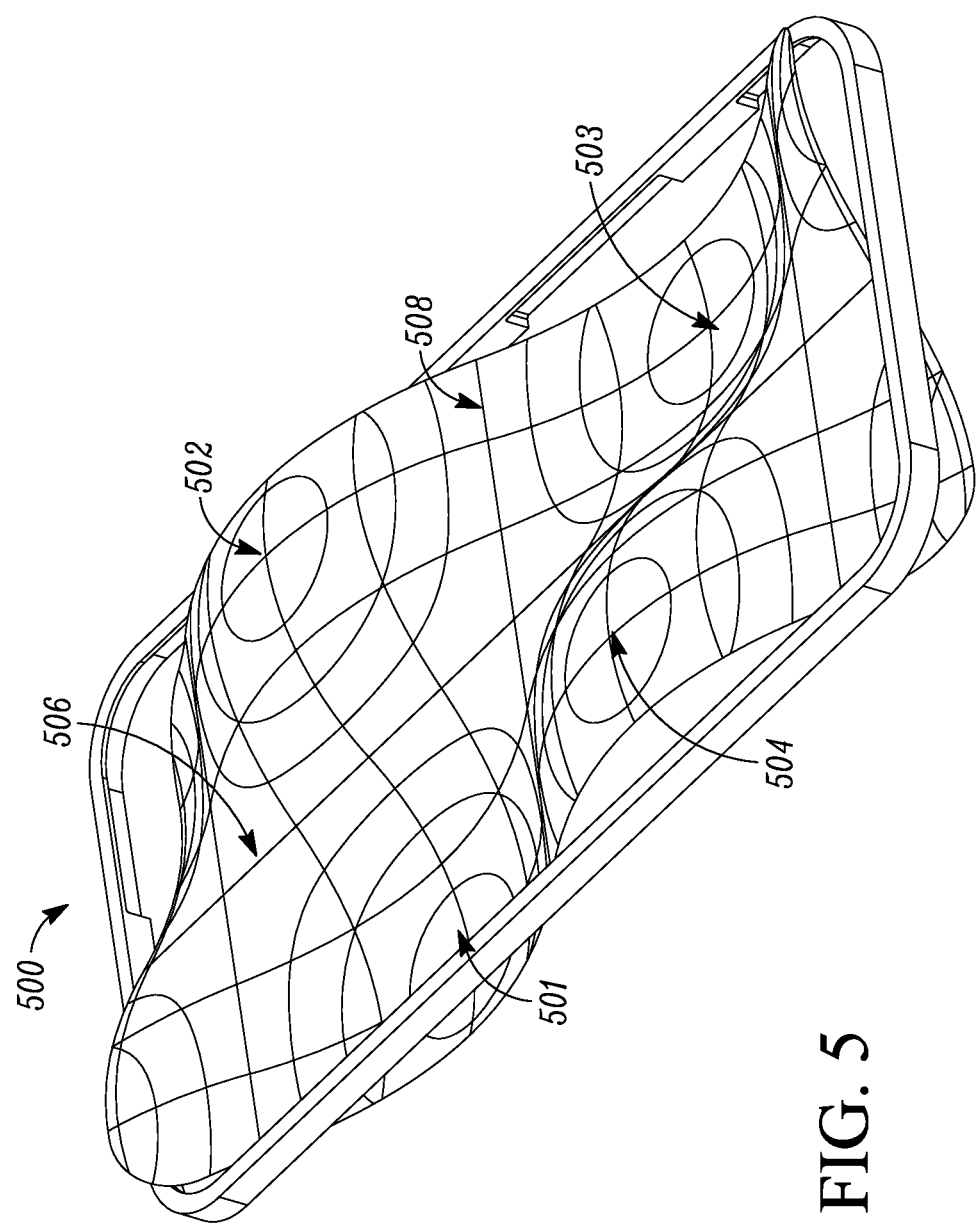
FIG. 5 shows an exemplary illustration of antinodes for a modal distribution.

Referring to FIG. 4, an exemplary rigid ring 400 around a display lens 402 is illustrated. Rigid ring 400 includes an outside edge 404 and inside ribs 406 that are selectively thickened in contrast to other thin sections 408, for example. As stated above with reference to FIG. 3, the ribs 406, where there is thickening of the stiffener ring, correlates to individual modes that one desires to shift. FIG. 5 shows an exemplary mode 500 and the antinodes 501, 502, 503, 504 of mode 500 that are intersected by nodal lines 506 and 508. Accordingly, deflection peaks are shown as rings and illustrated by tangent lines and gradients. Again, the points of greatest change in deformation are at the nodes and antinodes of the modes.

Figure 6:
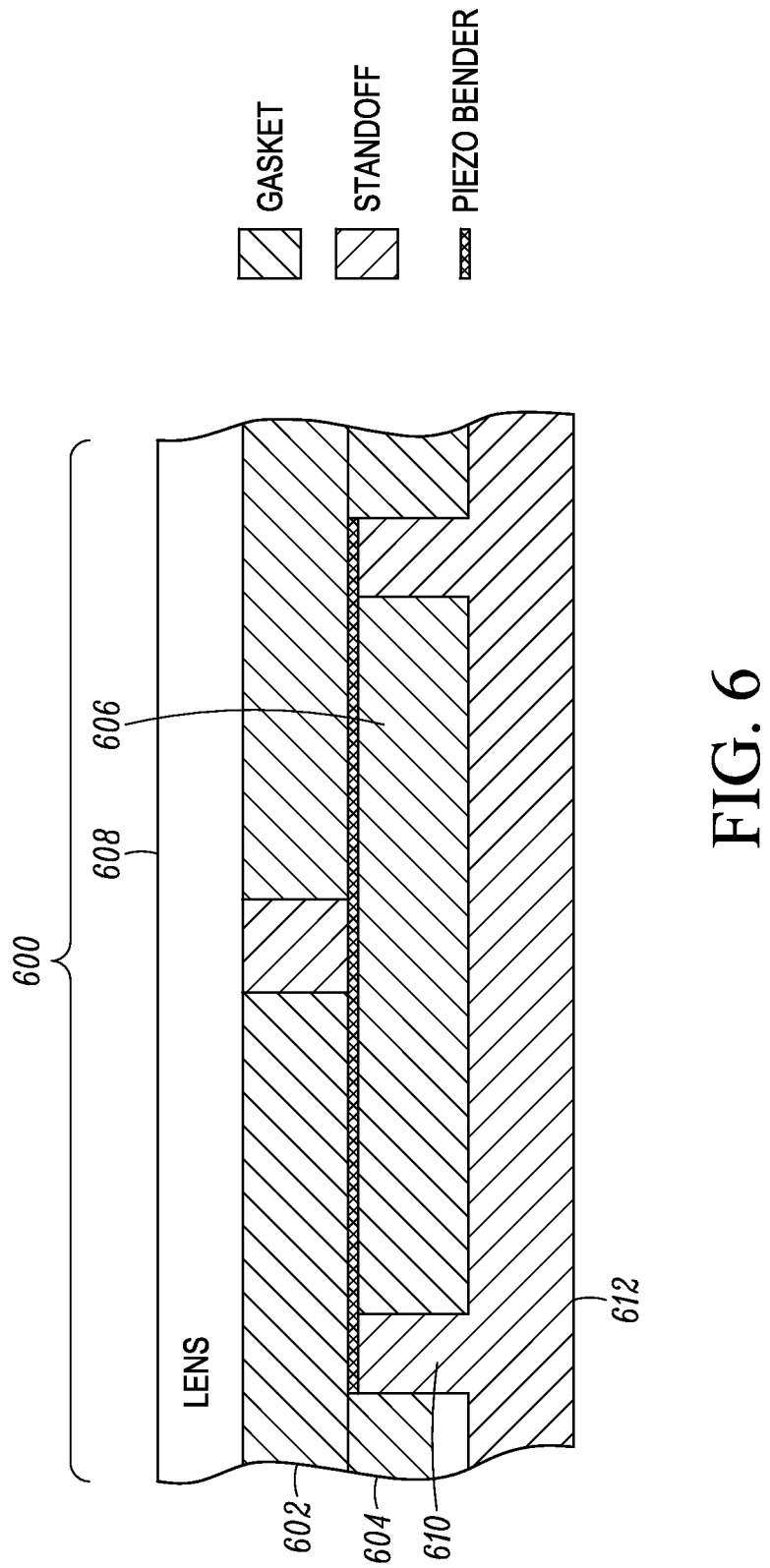
FIG. 6 shows an exemplary laminated embodiment of a piezoelectric structure.

Referring to FIG. 6, an exemplary embodiment of a laminated gasket structure 600 is shown. The exemplary laminated gasket structure 600 includes at least two gasket layers 602 and 604 that sandwich or surround one or more piezoelectric benders 606. Rigid or semi-rigid standoffs which serve as a supporting structure 610 are placed in cutouts in the laminated gasket structure 600 to directly couple bending motion from the piezoelectric benders 606 to a lens assembly 608. The lens assembly 608 may include a stiffener ring. In one embodiment, gaskets 602 and 604 are compliant enough to enable lens structure 608 to move freely relative to a housing 612, while also providing adequate damping for a first pistonic mode of the driven system. The pistonic mode of the transducer is the mode where the entire lens and stiffener ring move up and down without the surface bending appreciably.

Figure 7:
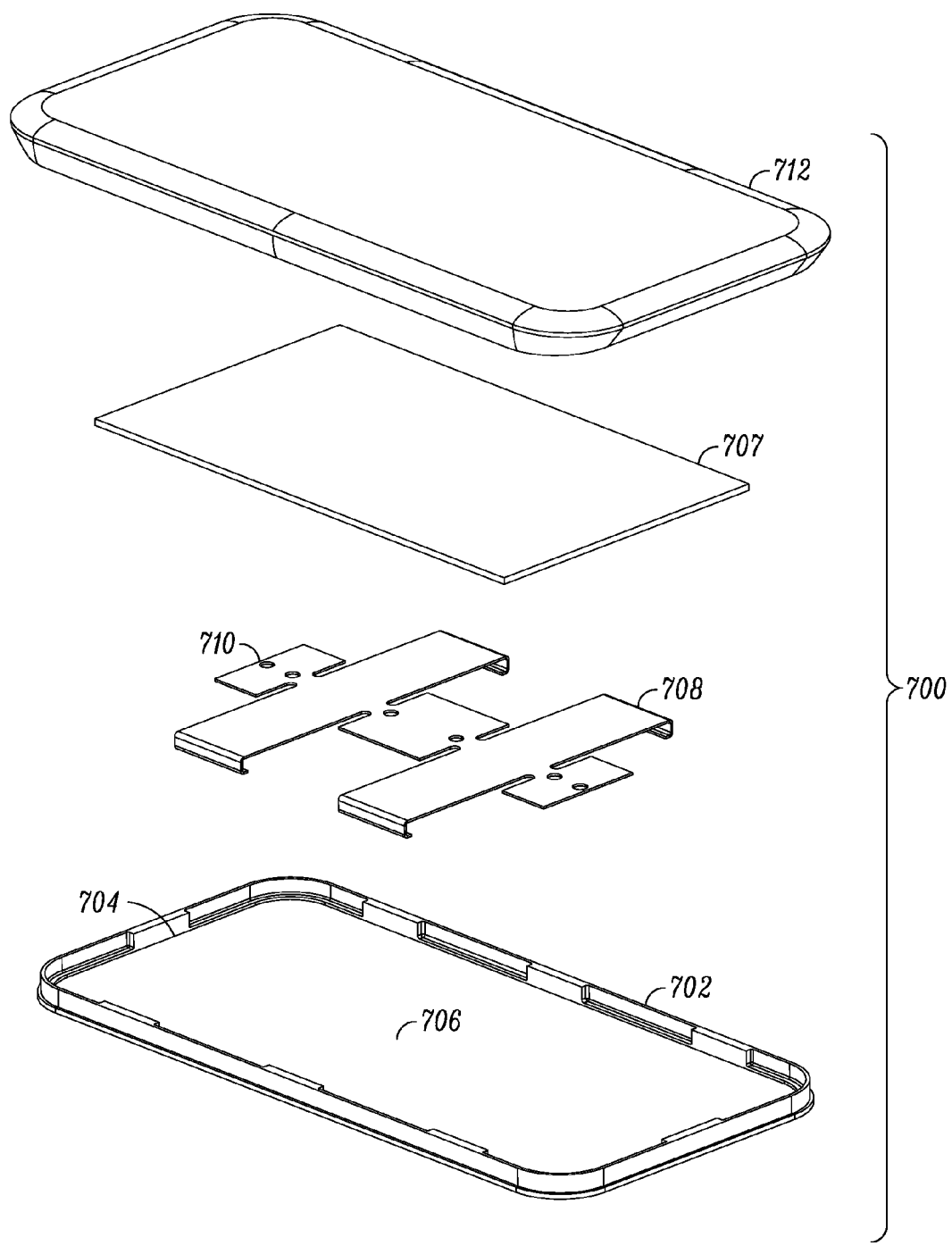
FIG. 7 shows an exploded view of an exemplary separation of the transducer and suspension.

FIG. 7 shows an exploded view 700 of an exemplary embodiment for the present invention; a driver implemented within a shield structure. A stiffener ring 702 includes discrete points 704 around the stiffener ring 702 to control modal behavior by further distributing modes, while allowing for lens to extend close to edge of an electronic device having a lens 706, such as a mobile phone or tablet PC, and yet still allows for the electronic device to comprise side buttons. Therefore, the drive structure does not need to completely surround the display as is typical in the aforementioned laminated gasket apparatus. The novel structure described here allows for a much longer cantilever arm to the drive element, thus resulting in more mechanical amplification.

This embodiment, shown in FIG. 7, also includes piezoelectric benders 708 in proximate contact with a supporting structure 710, for example, where the piezoelectric benders 708 are mounted to the supporting structure 710. The supporting structure 710, which can be a metal carrier, for example, can be constructed to serve as both a transducer support and a display shield. The arms of supporting structure 710 bend around the display 707 and mount to the stiffener ring 702 on the lens 706. The supporting structure 710 is also rigidly attached to housing 712 of the display device to create a mechanical ground.

Since the lens 706 needs to be free floating and move relative to a mechanical ground, the supporting structure 710 that attaches to the stiffener ring 702 on the lens 706 also attaches to the mechanical ground of the device 700. The display 707 and user interface controller (not shown) are also attached to the same mechanical ground. The mechanical ground can alternatively be a skeletal structure such as an endoskeleton with an aesthetic housing attached to the outside or the housing can also function as the skeletal structure. The skeletal structure with the attached components becomes a non-moving mechanical ground from which the lens will move.

Figure 9:
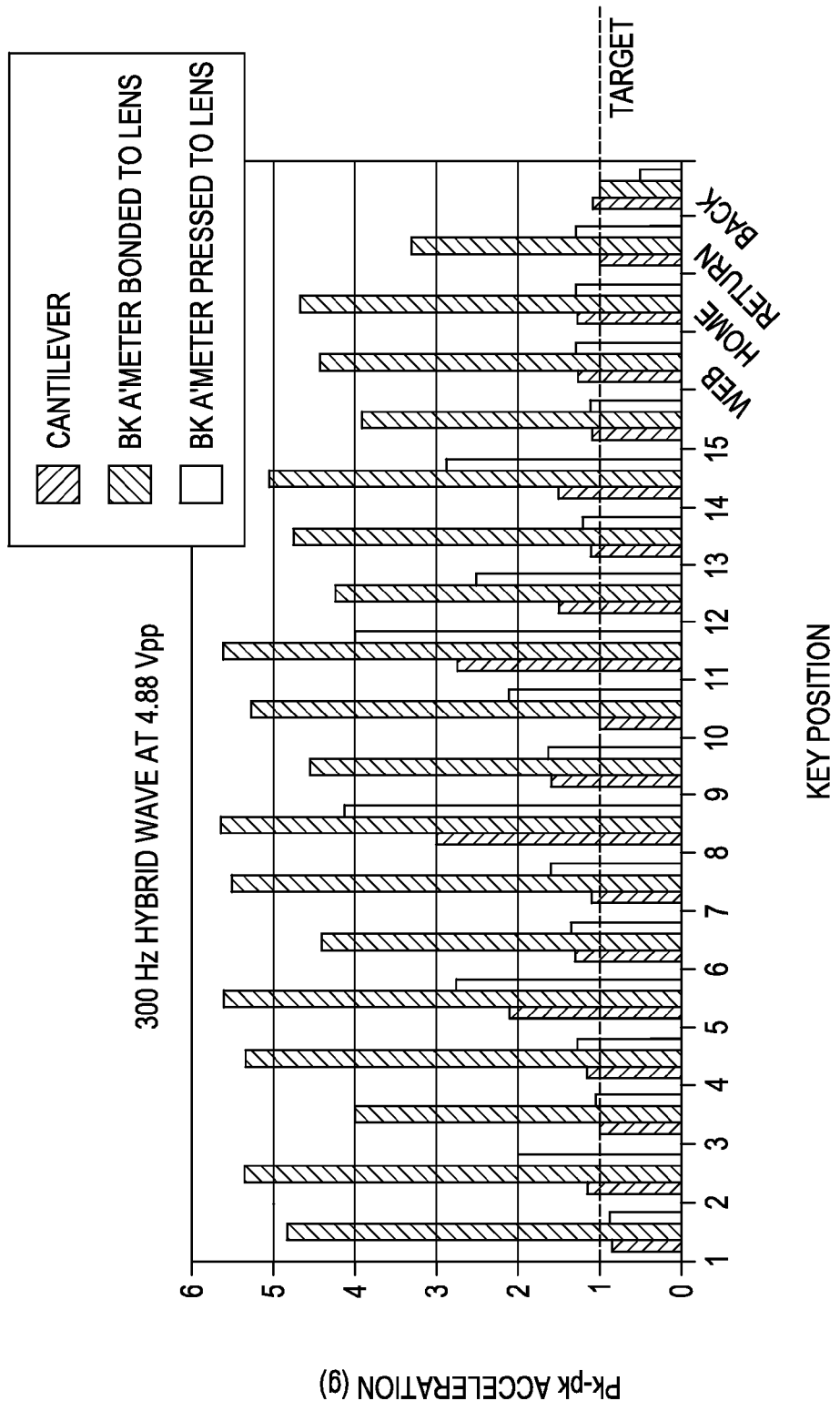
FIG. 9 shows a graph of measured haptics response correlating to a desired target haptics response.

In either the laminated gasket or shield/carrier case, driving at multiple points can further reduce the effect of the lens' modes. If two benders are used to drive the lens structure, the drive points can be located at antinodes of the mode with opposite amplitudes. The effect of driving these antinodes in phase would be a cancellation of modes with the opposing antinodes at the drive location. An example of such a mode is shown in FIG. 9. If driven by two benders at the drive points shown by the arrows, this mode would be practically eliminated.

The embodiment shown in FIG. 7 is further enhanced by a surround that keeps debris from entering the device. In addition, the surround enables suspension of the lens and provides damping. FIG. 8 shows multiple illustrative embodiments of an acoustic suspension seal (i.e., a surround). FIGS. 8A-8E illustrate a perpendicular sectional view. In FIGS. 8A-8E, each embodiment includes at least, a lens 802, a display 804, and a housing 806.

Figure 8B:
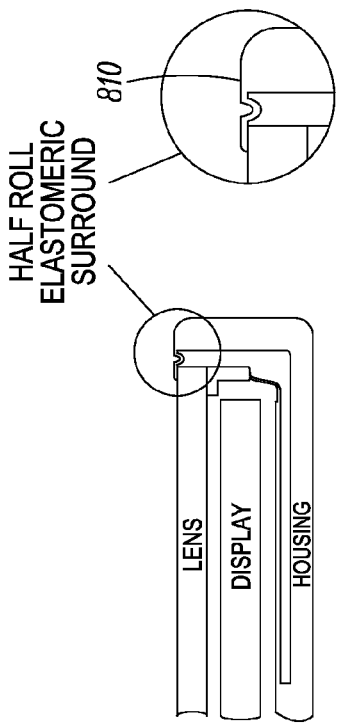
FIG. 8B shows a schematic of another exemplary embodiment of an acoustic suspension seal.
Figure 8D:
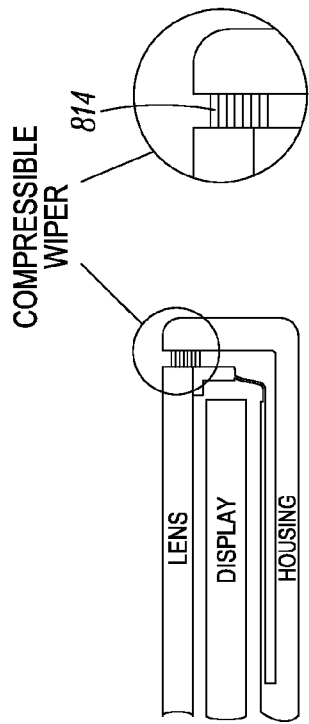
FIG. 8D shows a schematic of yet another exemplary embodiment of an acoustic suspension seal.
Figure 8A:
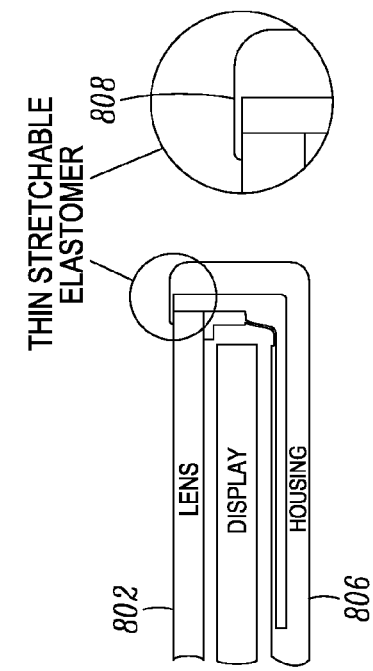
FIG. 8A shows a schematic of one exemplary embodiment of an acoustic suspension seal.

FIG. 8A shows a thin stretchable elastomer 808 that is flat at rest and stretches as lens 802 moves up and down. FIG. 8B shows a half roll elastomeric surround 810. The half roll elastomeric surround 810 can be either over-molded on the outside of housing 806 and lens 802, as shown in FIG. 8B. Alternatively, half roll elastomeric surround 810 can be mounted to the earlier described stiffener ring and, therefore, reside inside the device with only a thin gap showing around lens 802.

Figure 8C:
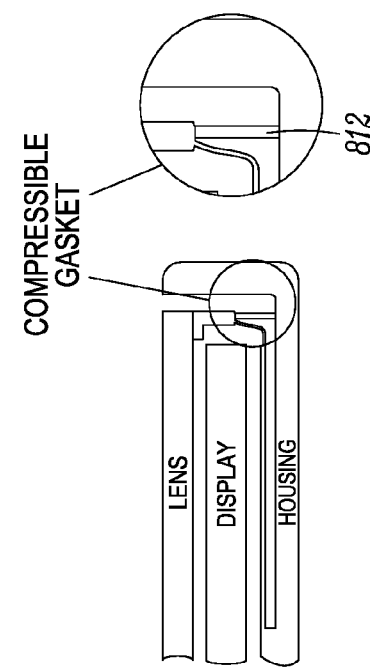
FIG. 8C shows a schematic of still another exemplary embodiment of an acoustic suspension seal.
Figure 8E:
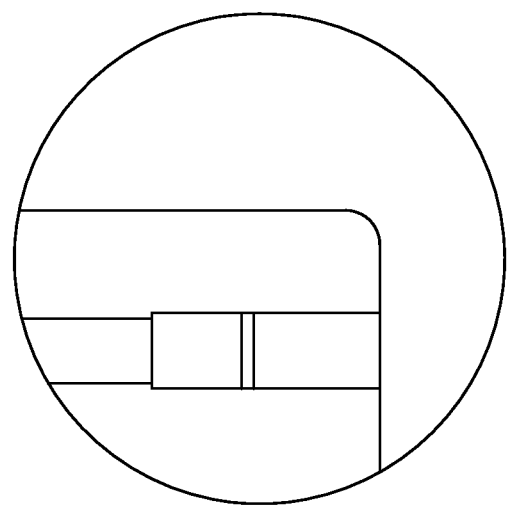
FIG. 8E shows a schematic of one exemplary embodiment of an acoustic suspension seal including a laminated gasket structure.
Figure 8E:

FIG. 8C illustrates a compression gasket 812 that runs along the entire stiffener ring to seal the lens 802 to the housing 806. FIG. 8C illustrates the metal carrier implementation of this invention, but this same surround solution could be used with the first laminated implementation as seen in FIG. 8E.

In another embodiment, FIG. 8D shows a compressible wiper 814 that is attached to one side of the gap, but slides along the other side. This wiper could be attached to the housing and slide freely along the stiffener and lens, or it could be firmly attached to the stiffener/lens subassembly and slide freely along the housing. A laminated implementation of a surround is shown in FIG. 8E. The lamination includes a piezo element.

FIG. 9 illustrates the unexpected results of implementation of the present invention. Regarding haptic response, the concept described herein exceeded not only goal levels, but previous attempts at piezo-haptics with a much lower drive level. Notably, FIG. 9 shows haptic measurements under three different methodologies using a 4.88V peak-to-peak signal. Previous methodologies required at least eight times higher voltage drive signals. Another great result is that the haptic response is substantially uniform across the touch surface of the device, as well as higher in amplitude than previous known implementations.

Figure 10:
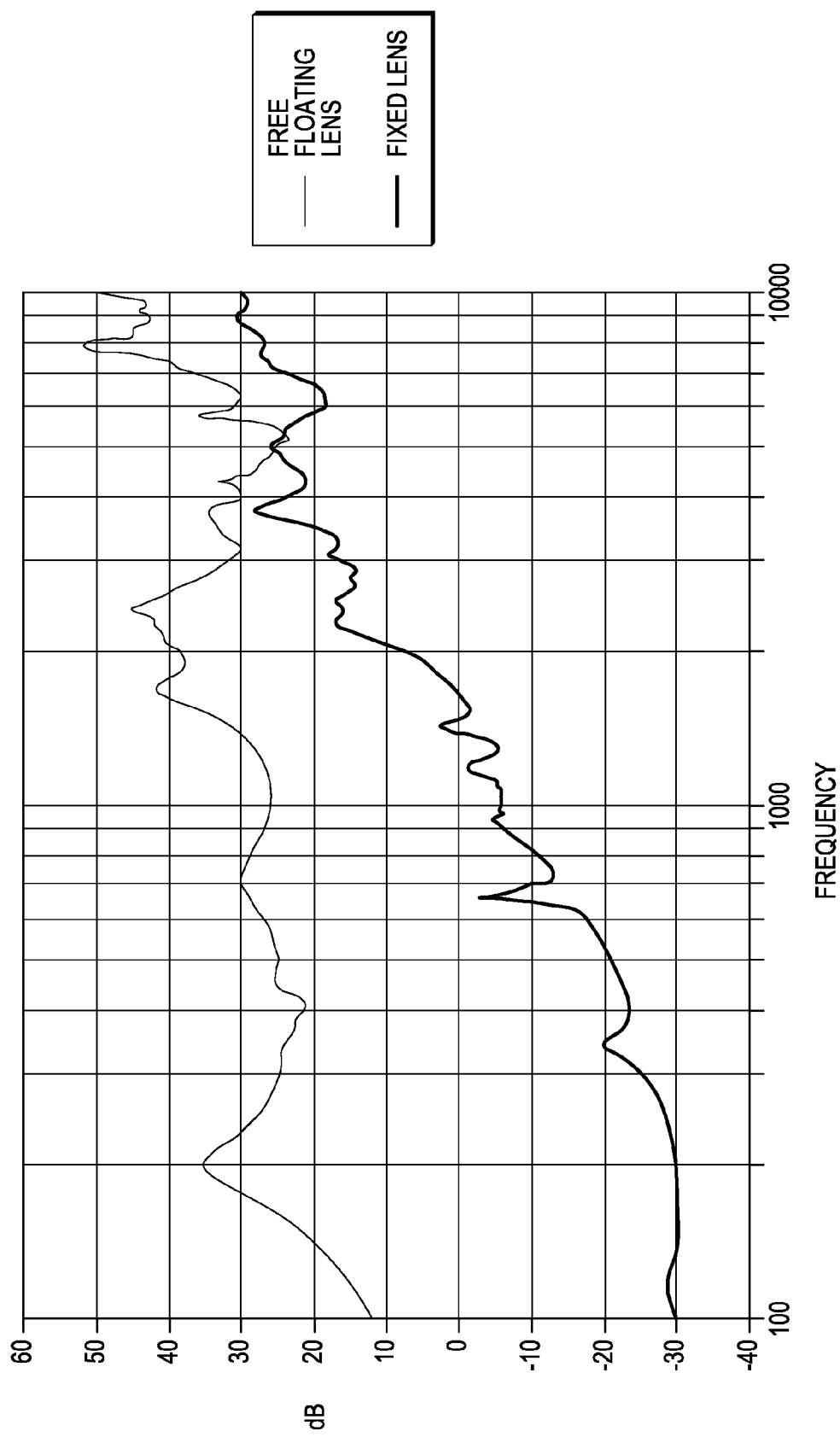
FIG. 10 shows a response comparison of free-floating and fixed lens systems.

FIG. 10 shows the advantage of the lens being free to move as opposed to rigidly adhered around its perimeter. The plot shows the difference in surface acceleration between the free-floating lens invention described here, and the conventional fixed lens systems known in the art. Surface acceleration can be related to the acoustic output of a pistonic device. FIG. 10 shows that there can be as much as a 50 dB improvement in sensitivity, at lower frequencies, over the known art.

The audio performance of this new invention has several advantages over previous attempts to drive a lens or display for audio purposes. The first advantage is that the freely mounted lens allows for a significantly lower first resonance. This can be as much as three octaves lower than previous piezoelectric driven speakerphones and two octaves lower than conventional moving coil dynamic speakerphones. A second advantage is that the output level is significantly higher than previous piezoelectric driven speakerphones. FIG. 10 shows that this new invention is 50 dB more efficient at 300 Hz, 32 dB more efficient at 1 kHz, and 7 dB more efficient at 4 kHz. This increase in efficiency of the transducer will allow the production of speakerphone audio with existing amplifier chips and a bandwidth that far exceeds normal handheld speakerphones.

In addition to the speaker phone characteristics, the vibration is very robust to mechanical load on the surface making this invention useful not only as a speakerphone, but also as a haptics device (also known as a vibrotactile device), and earpiece.

Figure 11:
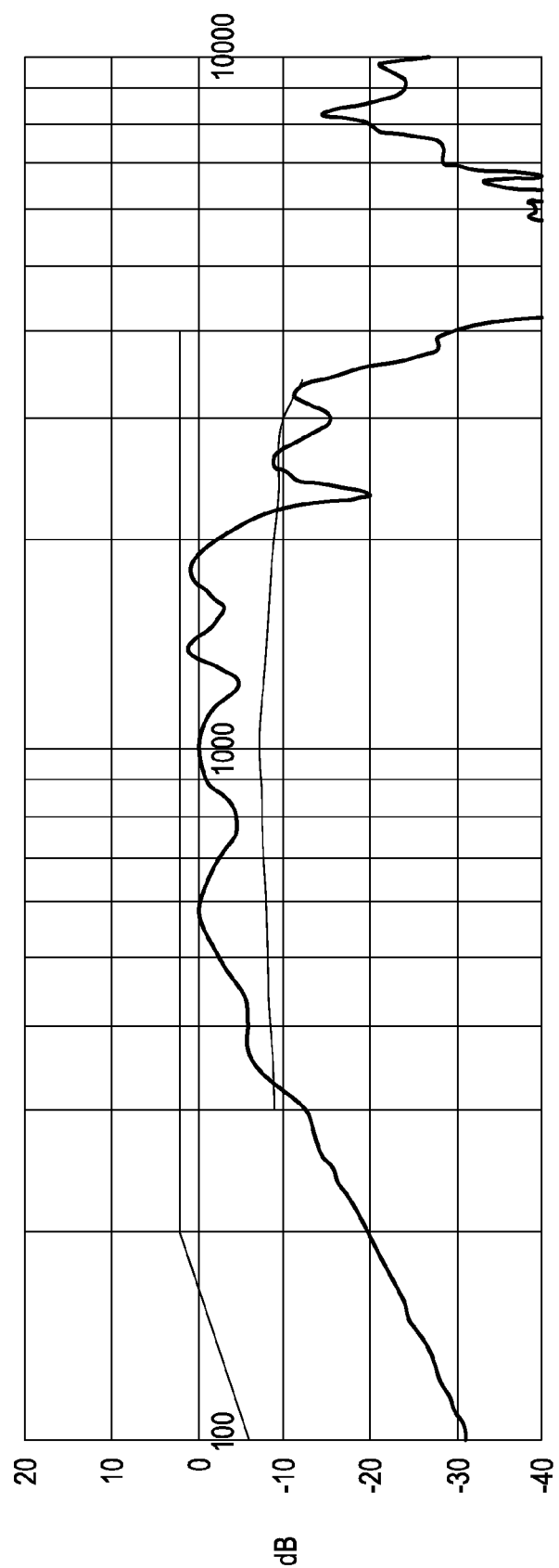
FIG. 11 shows an acoustic response of one exemplary embodiment as measured by an ear simulator in a private use mode.

Referring now to FIG. 11, the raw output frequency response of the transducer into an ear coupler is at a point where it is easily correctable with minor audio shaping. This was not possible with the previously known piezo on-glass techniques without significant electrical correction and loss of dynamic range. Therefore, this is the first instance where one would be able to produce a piezoelectric surface driven solution and provide acceptable downlink audio.

Past driving methods investigated for using a portable device's surface as a sound producing element have generally fallen into one of two general methods. These two methods can be classified as having a free or a fixed mounted drive transducer. The free mounted drive transducer has one side of the transducer mounted to the moving surface and the second side of the transducer floating freely in air. Depending on the method of transduction and the way in which the surface is attached to the device, the surface can be driven in a pistonic manner or in a bending manner. A freely mounted surface such as a free floating display lens is not rigidly fixed about its periphery and is allowed to move as a piston. A surface with a fixed outer edge cannot move as a piston, and can only move in a bending manner. In the case of MFT (multifunction transducer) systems or DML (distributed mode loudspeaker) systems, the transducer has a sprung mass that is driven relative to the radiating surface. Depending on the mounting, this method will have varying amounts of pistonic motion and bending motion. The drawback to this kind of system is the relative inefficiency of the transduction, since the transducer is of equal or lesser mass than the radiating surface, much of the energy is lost driving the motor structure of the transducer back and forth in the audio cavity. Another type of "freely" mounted transducer system does not rely on the mass of the transducer to excite the radiating surface, and instead relies on the bending of the surface corresponding to the transducer's bending mode. In this case, a piezoelectric transducer is mounted to the surface of the radiating structure on one side and free to move on the other. This drive scheme is inherently less efficient than a pistonic drive scheme in that the transducer not only has to move the weight of the radiating surface, but must also fight the molecular forces of the material to cause it to bend.

Figure 12B:
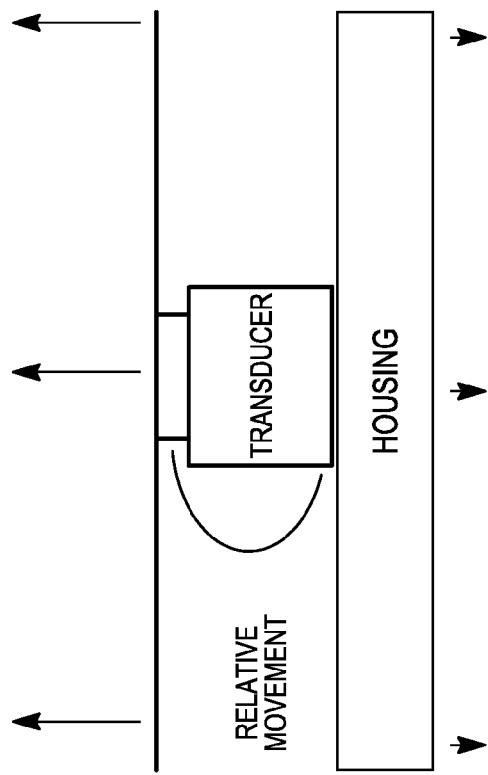
FIG. 12B illustrates an exemplary system in which the transducer is mounted in a fixed manner.
Figure 12A:
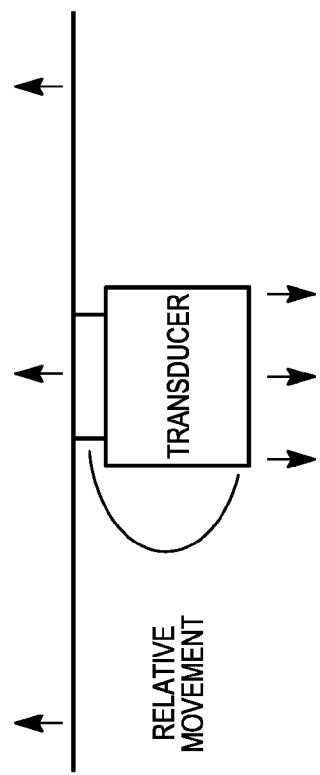
FIG. 12A illustrates an exemplary system in which the transducer is freely mounted.

In contrast to the freely mounted transducer described above, a more efficient method of driving the surface is with a fixed mounted or grounded transducer. In the case of the fixed transducer, one side of the transducer is mounted to the radiating surface and the other side of the transducer is mounted to the housing or skeletal structure which is essentially a mechanical ground structure since the housing or skeletal structure is much more massive than the radiating surface (lens). FIG. 12A shows the case of a transducer with a mass equivalent to that of the radiating surface, which is freely mounted. When the transducer is excited, equal displacement of the radiating surface happens in one direction as the transducer moves in the other direction. This phenomenon results in much of the energy being wasted in movement of the transducer. FIG. 12B shows the case of the transducer grounded to the housing. The combined mass of the housing and transducer is much more than that of the radiating surface, so the radiating surface displaces much more than the housing. It is the physical equivalent of trying to push someone away from you, while you are floating freely in a pool versus grounding yourself to the pool wall and then pushing the person away.

A system that exhibits only bending motion and not pistonic motion has the disadvantage over a pistonic system in that acoustic level is equivalent to the coherent displacement of volume of the radiating surface. FIG. 13 gives a pictorial example of this pistonic action. FIG. 13A depicts a freely mounted disc being driven in a pistonic manner. The grey line represents the disc at rest and the black line the maximally displaced disc. The whole disc moves as one coherent unit and displaces a volume equivalent to the surface area times the displacement. FIG. 13B depicts a similar disc being driven in a bending manner. Portions of the disc move upwards while other portions of the disc move downwards. The disc is freely mounted so that the outer edge is able to move. The net coherent volume displaced causes the acoustic output. The net coherent volume is the red area times the average red displacement minus the green area times the average green displacement. FIG. 13B clearly shows the net coherently displaced volume is significantly less that that of the pistonically driven system.

Figure 13C:
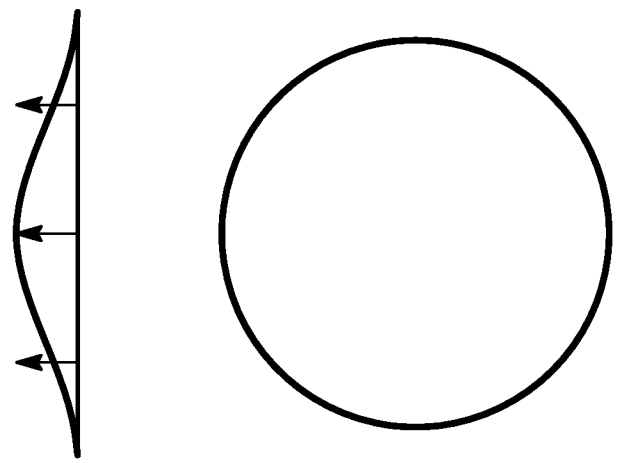
FIG. 13C illustrates the motion of a disk fixed about its periphery driven in a pistonic manner, but exhibiting bending behavior.
Figure 13B:
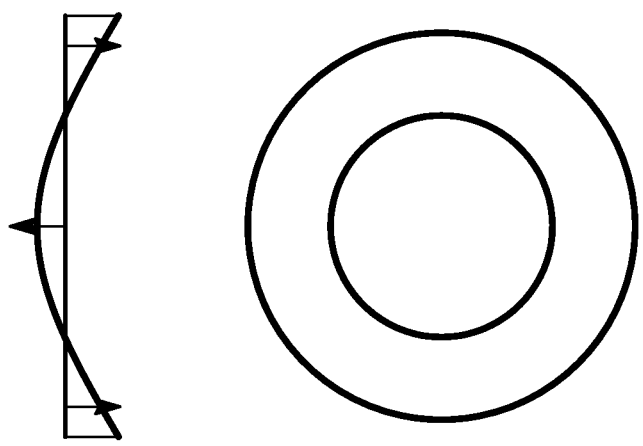
FIG. 13B illustrates the motion of a freely mounted disk driven in a bending manner.
Figure 13A:
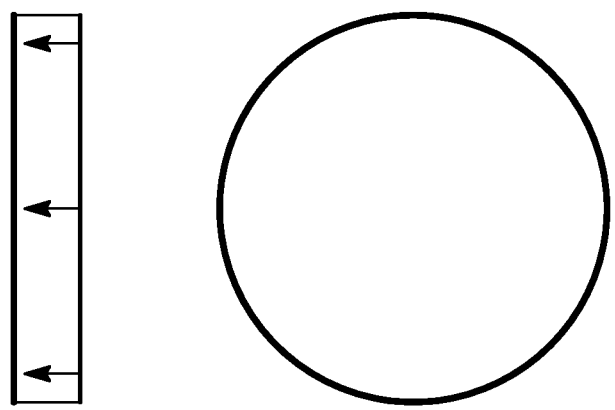
FIG. 13A illustrates the motion of a freely mounted disk driven in a pistonic manner.

Additionally, FIG. 13C depicts a disc being driven pistonically that is not freely mounted, but rather is fixed around its perimeter. Again, you can see that the displacement is less than the freely mounted piston, but in this case all movement is in the same direction, so no portion of the disc cancels the output of another portion of the disc. It is, therefore, most efficient if the mounting of the system can come as close as possible to a freely mounted surface.

While the electromechanical drive system described in this document has been described as a piezoelectric element, this has been done for illustrative purposes only. Any known electromechanical drive technology can be employed in place of the piezoelectric elements described herein. Examples of other electromechanical drive transducers can include, moving coil transducers, armature motors, linear motors, rotary motors tied to a linear track, etc.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims; and it is intended that the invention be construed as including all such modifications, changes, variations, substitutions and equivalents.

We claim:

1. A portable electronic device, comprising:
   a. a free floating display lens having a stiffener ring mounted on a peripheral region or edge of the free floating display lens;
   b. one or more electromechanical transducers carried on a supporting structure, the supporting structure having a first end attached to the stiffener ring;
   c. a display positioned between the free floating display lens and the supporting structure;
   d. a user interface controller that sends signals to the one or more electromechanical transducers to enable an acoustic signal in one mode and a vibratory haptic signal in another mode; and
   e. a housing that substantially encloses the one or more electromechanical transducers, the display, and the user interface controller.

2. The portable electronic device as claimed in claim 1, wherein the display is surrounded by the supporting structure.

3. The portable electronic device as claimed in claim 2, further comprising a skeletal structure for providing structural integrity to the portable electronic device.

4. The portable electronic device as claimed in claim 3, wherein the skeletal structure is mechanically grounded to a second end of the supporting structure.

5. The portable electronic device as claimed in claim 4, wherein the skeletal structure is a housing for the portable electronic device.

6. The portable electronic device as claimed in claim 3, wherein the supporting structure, for mounting the one or more electomechanical transducers, is a thin bendable structure attached at its periphery to the stiffener ring and at its center to the skeletal structure.

7. The portable electronic device as claimed in claim 6, wherein the electromechanical transducer is mounted in a bender configuration.

8. The portable electronic device as claimed in claim 6, wherein the electromechanical transducer is mounted in a cantilever configuration.

9. The portable electronic device as claimed in claim 6, further comprising an acoustic suspension seal.

10. The portable electronic device as claimed in claim 9, wherein the acoustic suspension seal is selected from the group consisting of a half roll elastomeric roll, a thin stretchable elastomer, a wiper, and a compression gasket.

11. The portable electronic device as claimed in claim 1, wherein the one or more electromechanical transducers is selected from the group consisting of an armature motor, a piezoelectric element, and a moving coil motor.

12. The portable electronic device as claimed in claim 1, wherein the supporting structure is an elastomeric gasket in combination with embedded rigid standoffs.

13. The portable electronic device as claimed in claim 12, wherein the electromechanical transducer is attached to the rigid standoffs causing the electromechanical transducer to operate in a cantilever fashion.

14. The portable electronic device as claimed in claim 12, wherein the electromechanical transducer is attached to the rigid standoffs at both ends and the middle of the electromechanical transducer thereby causing the electromechanical transducer to operate in a bender fashion.

15. The portable electronic device as claimed in claim 1, wherein the stiffener ring has varying thicknesses along circumference of the display.

16. The portable electronic device as claimed in claim 1, wherein the enabled acoustic signal is emitted as a private-level audio output in a private operating mode.

17. The portable electronic device as claimed in claim 1, wherein the enabled acoustic signal is emitted as a hands free, speakerphone level audio output in a speakerphone operating mode.

18. A method for providing audio and haptic signals to a free floating display lens of a portable electronic device, comprising the steps of:
   a) driving an electromechanical transducer carried by a supporting structure with an electrical signal to enable an acoustic signal in one mode and a vibratory haptic signal in another mode; and
   b) controlling frequency along varying thickness portions of a stiffener ring carried on the supporting structure; wherein the supporting structure comprises a first end attached to the stiffener ring mounted on a peripheral region or edge of the free floating display lens, and wherein a display is positioned between the free floating display lens and the supporting structure.

* * * * *